(12) United States Patent
Zhang et al.

(10) Patent No.: US 9,577,774 B2
(45) Date of Patent: Feb. 21, 2017

(54) TIME SYNCHRONIZATION METHOD AND SYSTEM

(71) Applicant: ZTE Corporation, Shenzhen (CN)

(72) Inventors: Junhui Zhang, Shenzhen (CN); Dongjia Liu, Shenzhen (CN); Li He, Shenzhen (CN); Liang Xia, Shenzhen (CN); Bin Wang, Shenzhen (CN); Hongguang Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 36 days.

(21) Appl. No.: 14/758,619

(22) PCT Filed: Dec. 12, 2013

(86) PCT No.: PCT/CN2013/089288
§ 371 (c)(1),
(2) Date: Sep. 15, 2015

(87) PCT Pub. No.: WO2014/101669
PCT Pub. Date: Jul. 3, 2014

(65) Prior Publication Data
US 2016/0013876 A1    Jan. 14, 2016

(30) Foreign Application Priority Data

Dec. 31, 2012 (CN) .......................... 2012 1 0591677

(51) Int. Cl.
*H04J 3/06* (2006.01)
(52) U.S. Cl.
CPC ............ *H04J 3/0667* (2013.01); *H04J 3/0641* (2013.01)
(58) Field of Classification Search
CPC ....................................................... H04J 3/06
(Continued)

(56) References Cited

U.S. PATENT DOCUMENTS

| 8,837,492 | B2 * | 9/2014 | Fourcand ................ H04L 47/10 370/395.4 |
| 2009/0029645 | A1 * | 1/2009 | Leroudier ............ H04B 7/2606 455/7 |

(Continued)

FOREIGN PATENT DOCUMENTS

| CN | 101222403 A | 7/2008 |
| CN | 102006135 A | 4/2011 |

(Continued)

OTHER PUBLICATIONS

International Search Report for corresponding application PCT/CN201/089288 filed Dec. 12, 2013; Mail date Mar. 20, 2014.

*Primary Examiner* — Shripal Khajuria
(74) *Attorney, Agent, or Firm* — Cantor Colburn LLP (57) ABSTRACT

Disclosed are a time synchronization method and system. The method comprises: an NE1 and the upstream nodes of the NE1 are classified into the first level, and the downstream nodes of the NE1 are classified into the second level, where the first level priority of the first level is higher than the second level priority of the second level; an NE3 connected to the NE1 through a PTP synchronization link in the downstream node receives a first device priority of the NE1 and the first level priority from the NE1; and after the NE3 receives the second device priority of an NE2 and the second level priority sent by the NE2 in the downstream nodes which is connected to the NE1 through the 1PPS+ TOD synchronization link, determines that a clock parameter of the NE1 is optimal, and synchronizes the local clock to the NE1.

19 Claims, 5 Drawing Sheets

(58) Field of Classification Search
USPC ......................................................... 370/350
See application file for complete search history.

(56) References Cited

U.S. PATENT DOCUMENTS

2011/0200051 A1* 8/2011 Rivaud ................. H04J 3/0641
370/400
2011/0255546 A1* 10/2011 Le Pallec .............. H04J 3/0679
370/400

FOREIGN PATENT DOCUMENTS

| CN | 102130736 A | 7/2011 |
| CN | 102368696 A | 3/2012 |
| KR | 100780670 B1 | 11/2007 |

* cited by examiner

TIME SYNCHRONIZATION METHOD AND SYSTEM

TECHNICAL FIELD

The disclosure relates to communication field, and including a time synchronization method and system.

BACKGROUND

With the high-speed development of 3G network, a Precision Time Protocol (simply "PTP" for short) has been taken more and more attentions and been applied widely. The PTP protocol is utilized consistently by operators at home and abroad for the time synchronization, and is gradually replacing the way of using Global Position System (simply "GPS" for short) for the time synchronization.

Currently, the time synchronization technologies utilized by operators include PTP, Network Time Protocol (simply "NTP" for short) and China Mobile's high precision time synchronization (1 Pulse per Second+Time of Day, 1PPS+TOD), which employ different protocol formats respectively. As applications of the time network expands continuously, intercommunication among different time synchronization technologies is required, for example, 1PPS+TOD is commonly used currently for the intercommunication between the synchronization technology of the Optical Transport Network (simply "OTN" for short) and the synchronization technology of the Packet Transport Network (simply "PTN" for short). In addition, within a synchronization network, there are different types of time interfaces on certain synchronization equipments. For example, there are a 1PPS+TOD interface and a PTP interface on a synchronization equipment, and at this point a mixed source selection needs to be supported. However, since the 1PPS+TOD protocol can only carry the time information and a second pulse state, can not carry more time source information, such as grandmother clock identity, priority parameters, the number of hops, the types of time sources and so on. Therefore, the upstream time source information is lost after passing through a 1PPS+TOD synchronization interface, thereby forming a timing loop under some situations.

Figure 1:
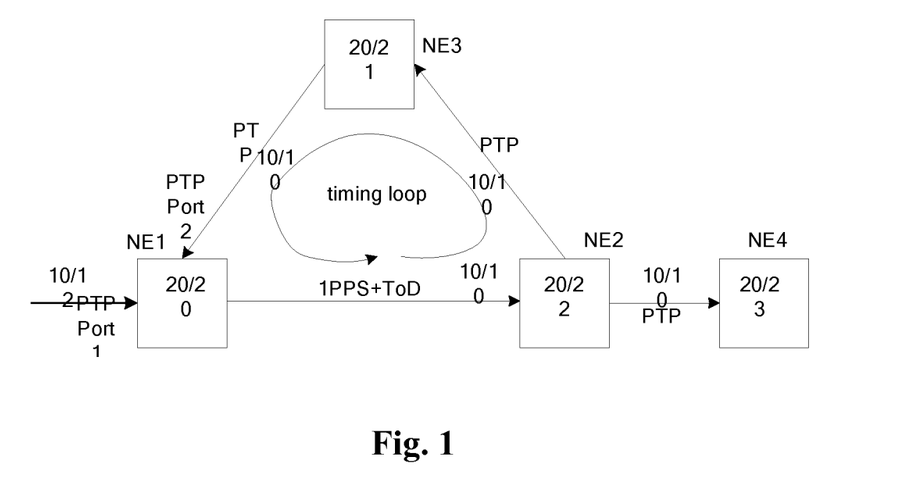
FIG. 1 is a schematic diagram of forming a timing loop under a situation of a time ring network according to the related art.

In the following, a process of forming the timing loop under a situation of a time ring network is introduced in detail:

FIG. 1 is a schematic diagram of forming a timing loop under a situation of a time ring network according to the related art, and as shown in FIG. 1, there are four synchronization equipments (network equipments) in the time ring network, i.e. network equipment 1 (NE1), network equipment 2 (NE2), network equipment 3 (NE3), and network equipment 4 (NE4), respectively. In this situation, there is a 1PPS+TOD link between the NE1 and the NE2, and there are PTP links among other adjacent equipments. Firstly, clock parameters of these equipments need to be configured within the time ring network, wherein the clock parameters mainly comprise: clock identity (ID) (for example, the clock identities of the NE1, the NE2, the NE3 and the NE4 can be uniquely represented by each MAC address respectively), priority level 1 (priority1), priority level 2 (priority2) and clock class and so on.

In particular, as shown in FIG. 1, the clock ID configured for NE2 is NE2 Mac, priority1=20, priority2=22, and so on for other NEs, and the requirements of an existing time synchronization method are that:

(1) when there are both 1PPS+TOD synchronization input interface and PTP input port on an equipment, it should support to select a best master time source among multiple PTP input sources and multiple 1PPS+TOD input sources;

(2) when the 1PPS+TOD is selected by the equipment as the current best master time source, and the type of the output port is PTP, it is needed to perform a parameter remapping, namely a data set of 1PPS+TOD reference sources is needed to be constructed on a local node, wherein the data set contains parameters such as: grandmother clock identity (grandmaster Identity), priority level 1 (priority1), priority level 2 (priority2), the class of the clock (Clock Class), port number (portNumber), the number of hops (stepsRemoved), the accuracy of the clock (clockAccuracy), the jitter of the clock (offsetScaledLogVariance), time source (timesource) and time scale (TimeScale);

(3) grandmasterIdentity, priority1 and priority2 shall be able to be configured on a network manager, and other parameters can be configured to be equipment default values, wherein the value of the Timesource is configured to be 0×20 by default, and the value of the stepsRemoved is configured to be 0 by default.

With reference to FIG. 1, there are two PTP ports and one 1PPS+TOD interface on the equipment NE1; suppose that PTP port 1 is selected as a slave port by the NE1, at this time another PTP port is the master port and the PTP port 2 send to the NE3 a PTP announce message, the parameters carried in the PTP announce message include GMid, priority1, priority2, ClockClass, stepsRemoved, timesource of a upstream time source, and these parameters are transferred from an upstream reference source. However, for the 1PPS+TOD interface, it can only carry a second pulse state and time information of the upstream, wherein the TOD second pulse state is mapped to the ClockClass of the PTP, and the time information includes the number of weeks and the number of seconds within a week; it can be found that other parameters of the upstream time source can not be transferred on the 1PPS+TOD interface, such as GMid, priority1, priority2, stepsRemoved, timesource and so on, and these parameters can only be constructed locally, namely the 1PPS+TOD interface is mapped into a common PTP port.

For the NE2, when the 1PPS+TOD interface is selected as a master time interface, with the configured parameters of priority1=10, priority2=10, which are superior to those of priority1=10, priority2=12 of a upstream time source; in addition, the NE2 also receives PTP announce messages of the upstream time source and the downstream time source from other PTP ports, but the NE2 will select the 1PPS+TOD interface as a master clock after a comparison by a BMC algorithm, and at this time the NE2 will send PTP announce messages to the NE1, the NE3 and the NE4 respectively; wherein, the parameters of the sent PTP announce messages are GMid=NE2, p1=10, p2=10, stepsRemoved=0, timesource=0×20; at this time, the NE3 will be synchronized to the NE2; for the NE1, it receives information sent respectively from two time sources via two PTP ports, and the NE1 will select the PTE port 2 as the master clock after a comparison by the BMC algorithm, thereby forming a timing loop. It can be seen with reference to FIG. 1, a particular process of forming a timing loop is as followings:

step 1, for the NE2, the 1PPS+TOD synchronization input interface is mapped into a PTP interface, namely a data set of 1PPS+TOD reference sources is constructed, and in the embodiment, it is supposed that the configurations are priority1=10, priority2=10;

step 2, the NE2 performs the BMC (Best Master Clock) algorithm, and selects the 1PPS+TOD interface as a master time source, and at this time, the 1PPS+TOD interface is in Slave state and other PTP interface are in a Master state;

step 3, via the PTP port, the NE2 sends respectively to the NE3, the NE4 the PTP announce message, the clock parameters carried in the PTP announce message are that respectively: grandmasterIdentity is MAC address of the NE2, the value of the priority1 is 10, the value of the priority2 is 10, and the value of the ClockClass is the value corresponding to the TOD second pulse state;

step 4, the NE3 receives the PTP announce message of the NE2, and finds that the clock parameters are superior to its own (since its own clock parameters are priority1=20, priority2=21, but the clock parameters from the NE2 are priority1=10, priority2=10), as the NE3 is synchronized to the NE2 according to the BMC algorithm;

step 5, the NE1 receives the announce message with priority1=10, priority2=10 from the NE3, and the NE1 is synchronized to the NE3 according to the BMC algorithm, thus a timing loop of NE1-NE2-NE3 being formed.

Aiming at the problem in the related art that it is liable to form a timing loop when a mixed source selection is performed among different time synchronization technologies, effective solutions are not presented so far.

Contents of Invention

A time synchronization method and system are provided in the disclosure, so at least to solve the above problem.

According to one aspect of the disclosure, a time synchronization method is provided, comprising: classifying a first Network Equipment (NE1) and upstream nodes of the NE1 in a time network into a first level, and classifying downstream nodes of the NE1 into a second level, wherein a first level priority that needs to be used in time synchronization of the first level is higher than a second level priority that needs to be used in time synchronization of the second level, and an output port of the NE1 is connected to a 1 Pulse per Second+Time of Day (1PPS+TOD) synchronization link; receiving, by a third Network Equipment (NE3) in the downstream nodes which is connected to the NE1 through a Precision Time Protocol (PTP) synchronization link, a first PTP announce message from the NE1, wherein the first PTP announce message carries a first equipment priority of the NE1 and the first level priority; and after the NE3 receives a second PTP announce message sent by a second Network Equipment NE2 in the downstream nodes which is connected to the NE1 through the 1PPS+TOD synchronization link, determining that a clock parameter of the NE1 is optimal according to the first PTP announce message and the second PTP announce message, and synchronizing a local clock to the NE1 according to the first PTP announce message, wherein the second PTP announce message carries a second equipment priority of the NE2 and the second level priority, and the first equipment priority is higher than the second equipment priority.

In an example embodiment, before classifying the NE1 and the upstream nodes of the NE1 in the time network into the first level, the method comprises: configuring, for the NE1, a first clock identity, the first level priority, the first equipment priority and a clock class, wherein the first clock identity is a Medium Access Control (MAC) address of the NE1; configuring, for the NE2, a second clock identity, the second level priority, the second equipment priority and the clock class, wherein the second clock identity is an MAC address of the NE2; configuring, for the NE3, a third clock identity, the second level priority, a third equipment priority and the clock class, wherein the third clock identity is an MAC address of the NE3; wherein, the second equipment priority is higher than the third equipment priority.

In an example embodiment, before receiving, by the NE3 in the downstream nodes which is connected to the NE1 through the PTP synchronization link, the first time synchronization message from the NE1, the method further comprises: mapping a 1PPS+TOD synchronization input interface of the NE2 into a PTP synchronization input port.

In an example embodiment, mapping the 1PPS+TOD synchronization input interface of the NE2 into the PTP synchronization input port comprises: constructing a data set of 1PPS+TOD reference sources for the NE2, wherein the data set comprises: the second clock identity, the second level priority, the second equipment priority, the clock class, port number, the number of hops, accuracy of clocks, jitter of clocks, a clock source and a time scale.

In an example embodiment, the first PTP announce message further comprises: the first clock identity and the clock class; the second PTP announce message further comprises: the second clock identity and the clock class.

In an example embodiment, the NE3 determining that the clock parameter of the NE1 is optimal according to the first PTP announce message and the second PTP announce message, and synchronizing the local clock to the NE1 according to the first PTP announce message comprises: after the NE3 determines that the first level priority is higher than the second level priority and the first equipment priority is higher than the second equipment priority, determining that the clock parameter of the NE1 is optimal; the NE3 synchronizing the local clock to the NE1 according to the first level priority, the first equipment priority, the first clock identity and the clock class in combination with a Best Master Clock (BMC) algorithm.

According the another aspect of the disclosure, a time synchronization system is provided, comprising: a classifying component, configured to classify a first Network Equipment (NE1) and upstream nodes of the NE1 in a time network into a first level, and classify downstream nodes of the NE1 into a second level, wherein a first level priority that needs to be used in time synchronization of the first level is higher than a second level priority that needs to be used in time synchronization of the second level, and an output port of the NE1 is connected to a 1 Pulse per Second+Time of Day (1PPS+TOD) synchronization link; a receiving component, on a third Network Equipment NE3, in the downstream nodes which is connected to the NE1 through a Precision Time Protocol (PTP) synchronization link, configured to receive a first PTP announce message from the NE1 and a second PTP announce message sent by a second network equipment NE2 which belongs to the downstream nodes, and is connected to the NE1 through the 1PPS+TOD synchronization link, wherein the first PTP announce message carries a first equipment priority of the NE1 and the first level priority; a determining component, on the NE3, configured to determine that a clock parameter of the NE1 is optimal according to the first PTP announce message and the second PTP announce message; a synchronizing component, on the NE3, configured to synchronize a local clock to the NE1 according to the first PTP announce message, wherein the second PTP announce message carries a second equipment priority of the NE2 and the second level priority, and the first equipment priority is higher than the second equipment priority.

In an example embodiment, the system further comprises: a configuring component, configured to configure, for the NE1, a first clock identity, the first level priority, the first equipment priority and a clock class, wherein the first clock identity is a Medium Access Control (MAC) address of the NE1; the configuring component is further configured to configure, for the NE2, a second clock identity, the second level priority, the second equipment priority and the clock class, wherein the second clock identity is an MAC address of the NE2; the configuring component is further configured to configure, for the NE3, a third clock identity, the second level priority, a third equipment priority and the clock class, wherein the third clock identity is an MAC address of the NE3; wherein, the second equipment priority is higher than the third equipment priority.

In an example embodiment, the system further comprises: a mapping component, configured to map a 1PPS+TOD synchronization input interface of the NE2 into a PTP synchronization input port.

In an example embodiment, the mapping component comprises: a constructing element, configured to construct a data set of 1PPS+TOD reference sources for the NE2, wherein the data set comprises: the second clock identity, the second level priority, the second equipment priority, the clock class, port number, the number of hops, accuracy of clocks, jitter of clocks, a clock source and a time scale.

In an example embodiment, the first PTP announce message further comprises: the first clock identity and the clock class; the second PTP announce message further comprises: the second clock identity and the clock class.

In an example embodiment, the determining component comprises: a determining element, configured to, after determining that the first level priority is higher than the second level priority and the first equipment priority is higher than the second equipment priority, determine that the clock parameter of the NE1 is optimal; the synchronizing component comprises: a synchronizing element, configured to synchronize the local clock to the NE1 according to the first level priority, the first equipment priority, the first clock identity and the clock class in combination with a Best Master Clock (BMC) algorithm.

Through the disclosure, the NE1 of which the output is connected to the 1PPS+TOD synchronization link in the time network, the upstream nodes of the NE1, and the downstream nodes of the NE1 are classified into different levels with different priorities, the NE3, in the downstream nodes which is the other nodes except the NE2 of which the output is connected to the 1PPS+TOD synchronization link, makes a judgement after receiving the time synchronization messages sent by the NE1 and the NE2 to determine that the time synchronization parameters of the NE1 are optimal, and then synchronizes a local clock into the NE1, thus solving the problem that it is liable to form a timing loop in the related art when a mixed source selection is performed among different time synchronization technologies, thereby achieving effects of enhancing the reliability of the time synchronization network and enlarging the field of the mixed application of different time synchronization technologies.

DESCRIPTION OF THE ACCOMPANYING DRAWINGS

The drawings described herein, which is used to provide a further understanding of the disclosure, constitutes a part of this application, and the schematic embodiments of the disclosure and their description are used to explain the disclosure and does not constitute a inappropriate limitation of the disclosure. In the accompanying drawings.

DETAILED DESCRIPTION OF THE EMBODIMENT

The disclosure will be described below with reference to the drawing and in conjunction with the embodiments. It should be noted that the embodiments and the characteristics of the embodiments can be combined with each other if no conflict is caused.

Figure 2:
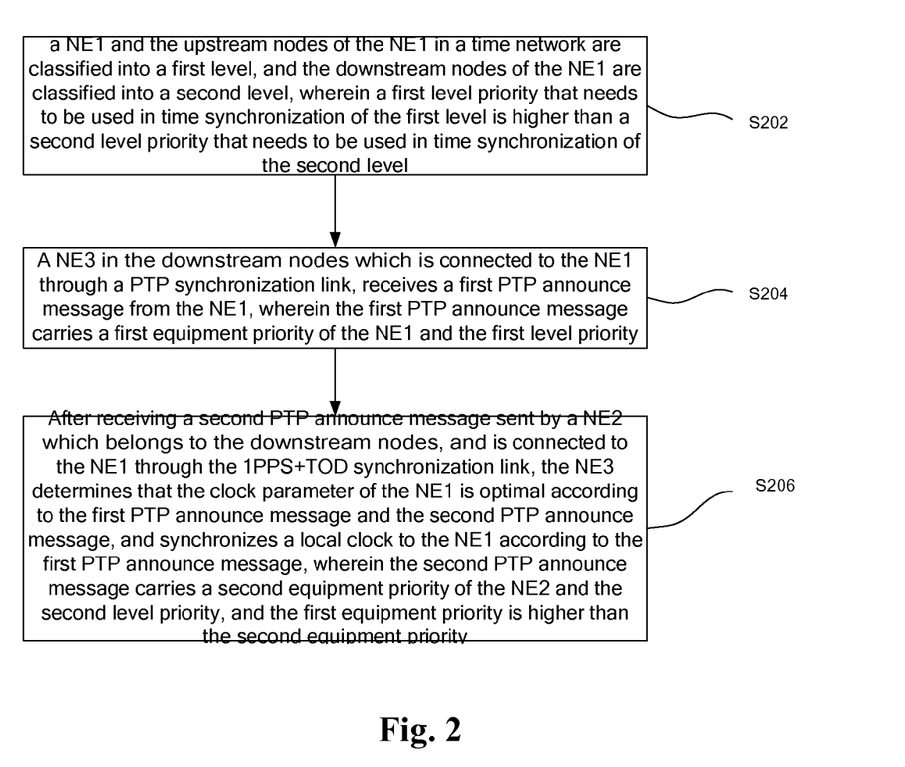
FIG. 2 is a flowchart of a time synchronization method according to an embodiment of the disclosure.

FIG. 2 is a flowchart of a time synchronization method according to an embodiment of the disclosure, and as shown in FIG. 2, the method mainly comprises the following steps (step S202 to step S206):

step 202, a NE1 and the upstream nodes of the NE1 in a time network are classified into a first level, and the downstream nodes of the NE1 are classified into a second level, wherein a first level priority that needs to be used in time synchronization of the first level is higher than a second level priority that needs to be used in time synchronization of the second level.

step S204, a NE3 in the downstream nodes which is connected to the NE1 through a PTP synchronization link, receives a first PTP announce message from the NE1, wherein the first PTP announce message carries a first equipment priority of the NE1 and the first level priority;

step S206, after receiving a second PTP announce message sent by a NE2 which belongs to the downstream nodes, and is connected to the NE1 through the 1PPS+TOD synchronization link, the NE3 determines that the clock parameter of the NE1 is optimal according to the first PTP announce message and the second PTP announce message, and synchronizes a local clock to the NE1 according to the first PTP announce message, wherein the second PTP announce message carries a second equipment priority of the NE2 and the second level priority, and the first equipment priority is higher than the second equipment priority.

In this embodiment, before step S202, the method can further comprise: a first clock identity, the first level priority, the first equipment priority and a clock class are configured for the NE1, wherein the first clock identity is an MAC address of the NE1; a second clock identity, the second level priority, the second equipment priority and the clock class are configured for the NE2, wherein the second clock identity is an MAC address of the NE2; a third clock identity, the second level priority, a third equipment priority and the clock class are configured for the NE3, wherein the third clock identity is an MAC address of the NE3; wherein the second equipment priority is higher than the third equipment priority.

In this embodiment, after the step S202 and before the step S204, the method further comprises that a 1PPS+TOD synchronization input interface of the NE2 is mapped into a PTP synchronization input port.

In an example embodiment, mapping the 1PPS+TOD synchronization input interface of the NE2 into the PTP synchronization input port comprises: a data set of 1PPS+ TOD reference sources is constructed for the NE2, wherein the data set comprises: the second clock identity, the second level priority, the second equipment priority, the clock class, port number, the number of hops, accuracy of clocks, jitter of clocks, a clock source and a time scale.

In this embodiment, the first PTP announce message further comprises: the first clock identity and the clock class; and the second PTP announce message further comprises: the second clock identity and the clock class.

In this embodiment, the NE3 determines according the first PTP announce message and the second PTP announce message that the clock parameter of the NE1 is optimal and synchronizes the local clock to the NE1 according to the first PTP announce message, which can be realized by the following way: after determining that the first level priority is higher than the second level priority and the first equipment priority is higher than the second equipment priority, the NE3 determines that the clock parameter of the NE1 is optimal; the NE3 synchronizes the local clock to the NE1 according to the first level priority, the first equipment priority, the first clock identity and the clock class in combination with a BMC algorithm.

In a practical application, firstly the 1PPS+TOD synchronization input interface is mapped into the PTP port, namely a data set of 1PPS+TOD reference sources is constructed on a local node (a synchronization equipment with multiple types of synchronization interfaces), and the data set comprises: grandmasterIdentity, priority1, priority2, ClockClass, portNumber, stepsRemoved, clockAccuracy, offsetScaledLogVariance, timesource, TimeScale; further, the priority1 and the priority2 are configured on the 1PPS+TOD interface to perform a mixed source selection with respect to the PTP interface; on the local node, the parameters such as grandmasterIdentity, ClockClass, priority1, priority2 and so on are configured, but the priorities of these configured parameters must be lower than the priorities of upstream nodes, namely the PTP priority1 is adopt to perform a synchronization network levelling/classification, with priority1 of synchronization networks in a same level; the PTP priority2 is used to distinguish master and slave, namely the priority2 is adopt to perform a master-to-slave shift for equipments in the same layer/level. At this time, when an equipment selects the 1PPS+TOD as the optimal master time source, and the type of the output port is PTP, the priority parameters (grandmasterPriority1/grandmasterPriority2) in the PTP announce message sent can be the priority parameters (priority1/priority2) configured on the local node; finally, when an upstream node receives the PTP announce message sent by the local node and finds that the priority parameters (grandmasterPriority1/grandmasterPriority2) in the message are lower than its own clock priority parameters (priority1/priority2), the local node is not selected as the optimal master time source; thereby a timing loop is avoided.

The time synchronization method provided in the above embodiment is further described below in combination with FIG. 3 and FIG. 4 as well as an example embodiment. By way of the time synchronization method provided in the example embodiment, the problem in the existing methods that it is liable to form a timing loop when a mixed source selection is performed among different time synchronization technologies can be avoided, and its steps are as following: (1) the time network is categorized by means of the clock priority parameters; (2) when a 1PPS+TOD interface is selected as a master clock, the clock priority carried in the PTP announce message sent to the downstream is lower the clock priority of the upstream reference sources and the clock priority of the stream nodes.

Figure 3:
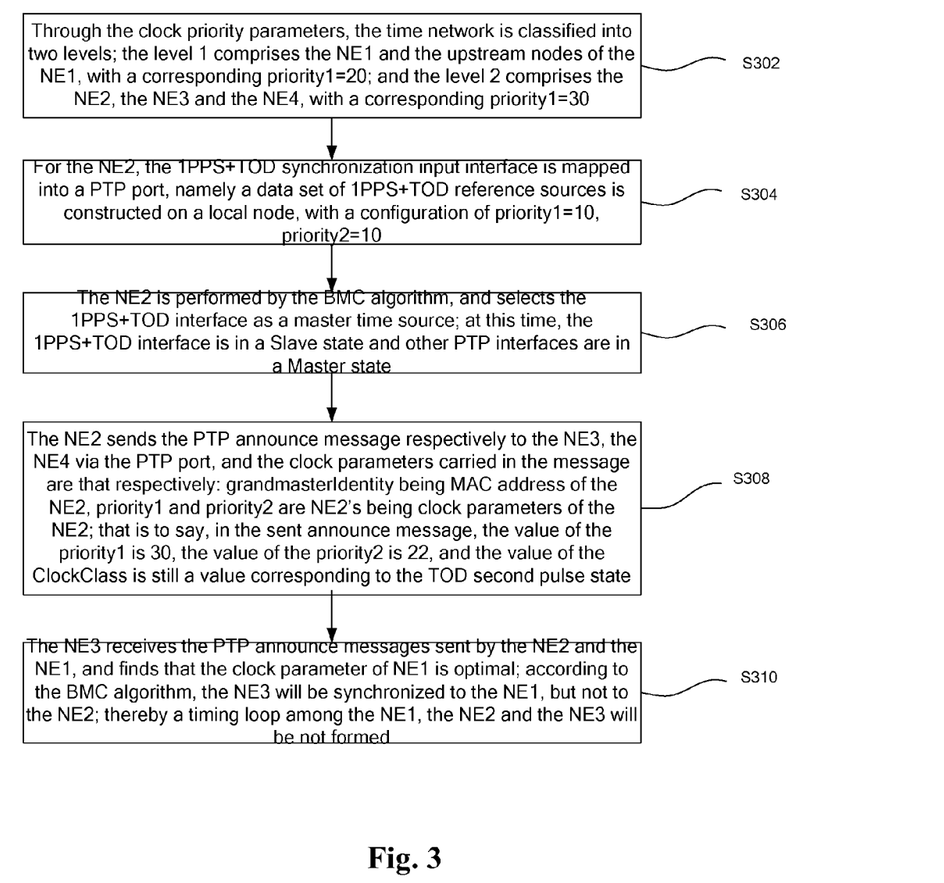
FIG. 3 is a flowchart of a time synchronization method under a situation of a time ring network according to an example embodiment of the disclosure.
Figure 4:
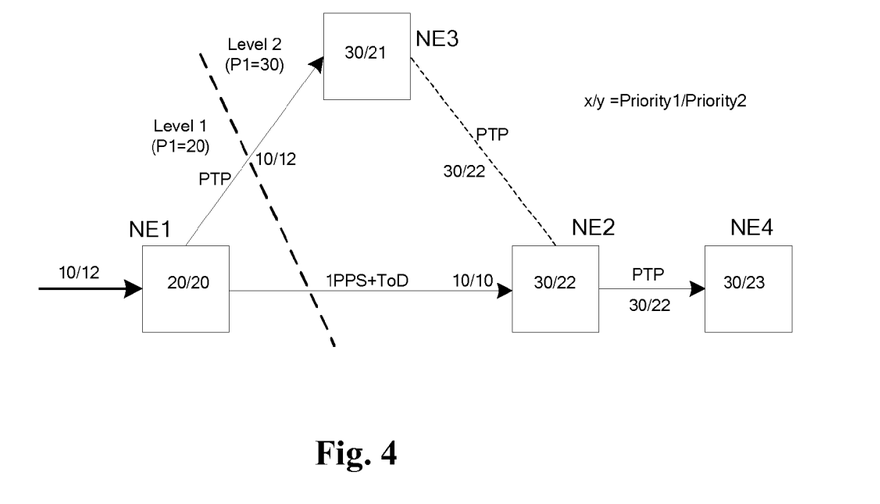
FIG. 4 is a schematic diagram of time synchronization under a situation of a time ring network according to an example embodiment of the disclosure.

With reference to both FIG. 3 and FIG. 4, FIG. 3 is a flowchart of a time synchronization method under a situation of a time ring network according to a preferred embodiment of the disclosure, and FIG. 4 is a schematic diagram of time synchronization under a situation of a time ring network according to an example embodiment of the disclosure. As shown in FIG. 3, the time synchronization method provided in the preferred embodiment comprises the following steps (step S302-step S310):

In step S302, through the clock priority parameters, the time network is classified into two levels; the level 1 comprises the NE1 and the upstream nodes of the NE1, with a corresponding priority1=20; and the level 2 comprises the NE2, the NE3 and the NE4, with a corresponding priority1=30.

In step S304, for the NE2, the 1PPS+TOD synchronization input interface is mapped into a PTP port, namely a data set of 1PPS+TOD reference sources is constructed on a local node, with a configuration of priority1=10, priority2=10.

In step S306, the NE2 is performed by the BMC algorithm, and selects the 1PPS+TOD interface as a master time source; at this time, the 1PPS+TOD interface is in a Slave state and other PTP interfaces are in a Master state.

In step S308, the NE2 sends the PTP announce message respectively to the NE3, the NE4 via the PTP port, and the clock parameters carried in the message are that respectively: grandmasterIdentity being MAC address of the NE2, priority1 and priority2 are NE2 being clock parameters of the NE2; that is to say, in the sent announce message, the value of the priority1 is 30, the value of the priority2 is 22, and the value of the ClockClass is still the value corresponding to the TOD second pulse state.

In step S310, the NE3 receives the PTP announce messages sent by the NE2 and the NE1, and finds that the clock parameter of NE1 is optimal; according to the BMC algorithm, the NE3 will be synchronized to the NE1, but not to the NE2; thereby a timing loop among the NE1, the NE2 and the NE3 will be not formed (referring to FIG. 4).

Through the time synchronization method provided in the above embodiment, the problem in the related art that it is liable to form a timing loop when a mixed source selection is performed among different time synchronization technologies can be solved, thereby achieving effects of enhancing the reliability of the time synchronization network and enlarging the field of the mixed application of different time synchronization technologies.

Figure 5:
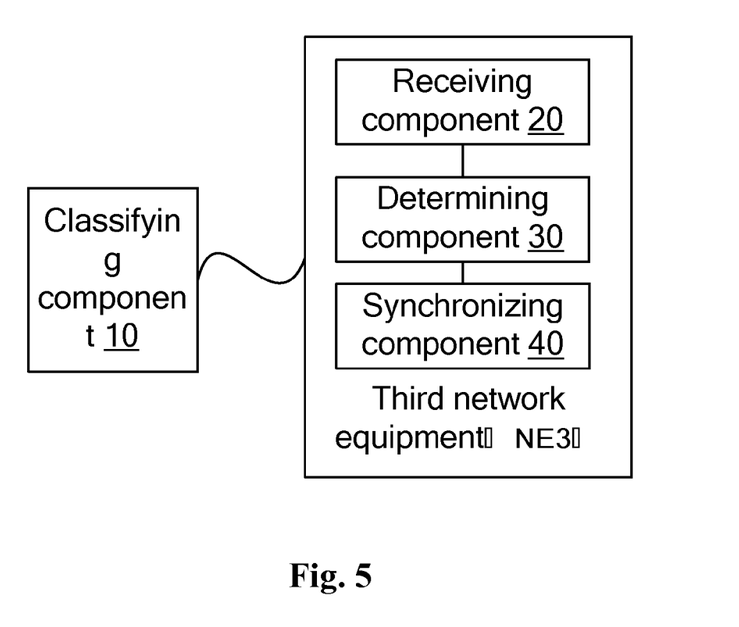
FIG. 5 is a structure diagram of a time synchronization system according to an embodiment of the disclosure.

FIG. 5 is a structure diagram of a time synchronization system according to an embodiment of the disclosure, which is used for realizing the time synchronization method provided in the above embodiment, and as shown in FIG. 5, the system mainly comprises: a classifying component 10, a receiving component 20, a determining component 30 and a synchronizing component 40. Wherein, the classifying component 10 is configured to classify a NE1 and the upstream nodes of the NE1 in a time network into a first level, and classify the downstream nodes of the NE1 into a second level, wherein a first level priority that needs to be used in time synchronization of the first level is higher than a second level priority that needs to be used in time synchronization of the second level, and an output port of the NE1 is connected to a 1PPS+TOD synchronization link; the receiving component 20 is on a third network equipment NE3 in the downstream nodes which is connected to the NE1 through a PTP synchronization link and configured to receive a first PTP announce message from the NE1 and a second PTP announce message sent by an NE2 which belongs to the downstream nodes, and is connected to the NE1 through the 1PPS+TOD synchronization link, wherein the first PTP announce message carries a first equipment priority of the NE1 and the first level priority; the determining component 30 is on the NE3 and configured to determine that a clock parameter of the NE1 is optimal according to the first PTP announce message and the second PTP announce message; and the synchronizing component 40 is on the NE3 and configured to synchronize a local clock to the NE1 according to the first PTP announce message, wherein the second PTP announce message carries a second equipment priority of the NE2 and the second level priority, and the first equipment priority is higher than the second equipment priority.

Figure 6:
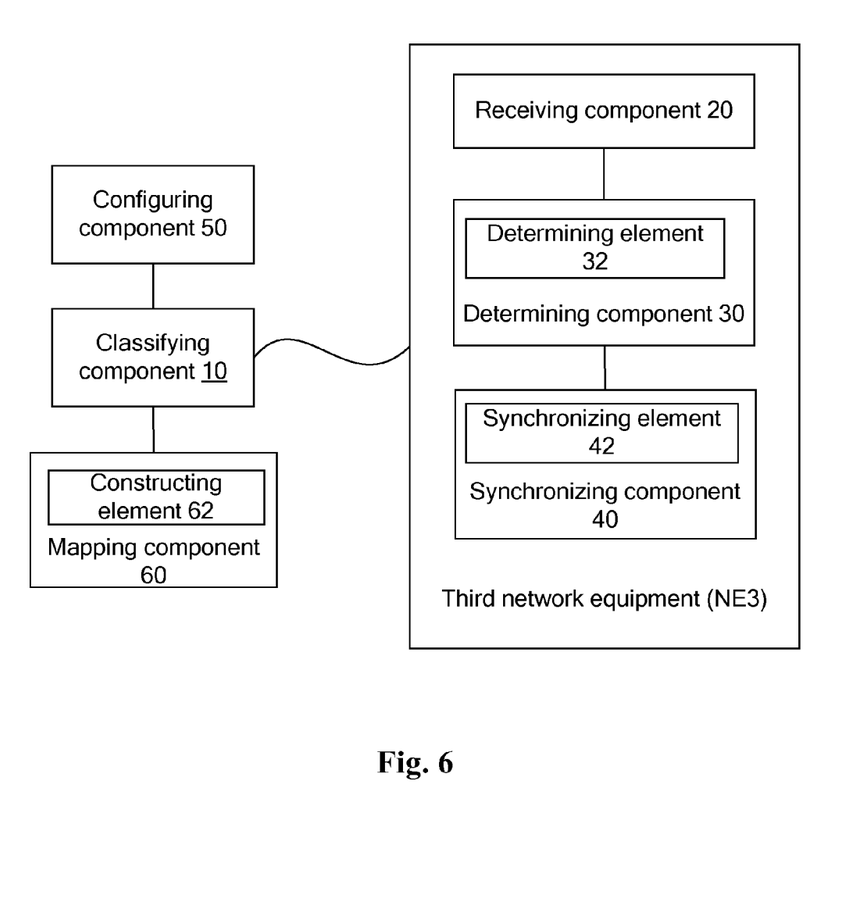
FIG. 6 is a structure diagram of a time synchronization system according to an example embodiment of the disclosure.

FIG. 6 is a structure diagram of a time synchronization system according to an example embodiment of the disclosure, and as shown in FIG. 6, the time synchronization system provided in the example embodiment further comprises: a configuring component 50, configured to configure, for the NE1, a first clock identity, the first level priority, the first equipment priority and a clock class, wherein the first clock identity is an MAC address of the NE1; the configuring component 50 is further configured to configure, for the NE2, a second clock identity, the second level priority, the second equipment priority and the clock class, wherein the second clock identity is an MAC address of the NE2; the configuring component 50 is further configured to configure, for the NE3, a third clock identity, the second level priority, a third equipment priority and the clock class, wherein the third clock identity is an MAC address of the NE3; wherein, the second equipment priority is higher than the third equipment priority.

The time synchronization system provided in an example embodiment further comprises: a mapping component 60, configured to map a 1PPS+TOD synchronization input interface of the NE2 into a PTP synchronization input port.

In the example embodiment, the mapping component 60 comprises: a constructing element 62, configured to construct a data set of 1PPS+TOD reference sources for the NE2, wherein the data set comprises: the second clock identity, the second level priority, the second equipment priority, the clock class, port number, the number of hops, accuracy of clocks, jitter of clocks, a clock source and a time scale.

In an example embodiment, the first PTP announce message further comprises: the first clock identity and the clock class; the second PTP announce message further comprises: the second clock identity and the clock class.

In an example embodiment, the determining component 30 comprises: a determining element 32, configured to, after determining that the first level priority is higher than the second level priority and the first equipment priority is higher than the second equipment priority, determine that the clock parameter of the NE1 is optimal; a synchronizing element 42, configured to synchronize the local clock to the NE1 according to the first level priority, the first equipment priority, the first clock identity and the clock class in combination with a BMC algorithm.

Through the time synchronization method provided in the above embodiment, the problem in the related arts that it is liable to form a timing loop when a mixed source selection is performed among different time synchronization technologies can be solved, thereby achieving effects of enhancing the reliability of the time synchronization network and enlarging the field of the mixed application of different time synchronization technologies.

It can be seen from the above description, the disclosure achieves the following technical effects: the NE1 of which the output is connected to the 1PPS+TOD synchronization link in the time network, the upstream nodes of the NE1, and the downstream nodes of the NE1 are classified into different levels with different priorities, the NE3, which belongs to the downstream nodes, and is the other nodes except the NE2 of which the output is connected to the 1PPS+TOD synchronization link, makes a judgement after receiving the time synchronization messages sent by the NE1 and the NE2 to determine that the time synchronization parameters of the NE1 are optimal, and then synchronizes a local clock into the NE1, thus solving the problem in the related art that it is liable to form a timing loop when a mixed source selection is performed among different time synchronization technologies, thereby achieving effects of enhancing the reliability of the time synchronization network and enlarging the field of the mixed application of different time synchronization technologies.

Apparently, those skilled in the art shall understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the disclosure is not restricted to any particular hardware and software combination.

INDUSTRIAL APPLICABILITY

By way of the technical solution of the disclosure, the NE1 of which the output is connected to the 1PPS+TOD synchronization link in the time network, the upstream nodes of the NE1, and the downstream nodes of the NE1 are classified into different levels with different priorities, the NE3, which belongs to the downstream nodes, and is the other nodes except the NE2 of which the output is connected to the 1PPS+TOD synchronization link, makes a judgement after receiving the time synchronization messages sent by the NE1 and the NE2 to determine that the time synchronization parameters of the NE1 are optimal, and then synchronizes a local clock into the NE1. In this way, an effect of enhancing the reliability of the time synchronization network is achieved.

The above description is only example embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope of the disclosure.

What is claimed is:
1. A time synchronization method, comprising:
classifying a first Network Equipment (NE1) and upstream nodes of the NE1 in a time network into a first level, and classifying downstream nodes of the NE1 into a second level, wherein a first level priority that needs to be used in time synchronization of the first level is higher than a second level priority that needs to be used in time synchronization of the second level, and an output port of the NE1 is connected to a 1 Pulse per Second+Time of Day (1PPS+TOD) synchronization link;

receiving, by a third Network Equipment (NE3) in the downstream nodes which is connected to the NE1 through a Precision Time Protocol (PTP) synchronization link, a first PTP announce message from the NE1, wherein the first PTP announce message carries a first equipment priority of the NE1 and the first level priority;

and after the NE3 receives a second PTP announce message sent by a second Network Equipment (NE2) in the downstream nodes which is connected to the NE1 through the 1PPS+TOD synchronization link, determining that a clock parameter of the NE1 is optimal according to the first PTP announce message and the second PTP announce message, and synchronizing a local clock to the NE1 according to the first PTP announce message, wherein the second PTP announce message carries a second equipment priority of the NE2 and the second level priority, and the first equipment priority is higher than the second equipment priority.

2. The method according to claim 1, wherein before classifying the NE1 and the upstream nodes of the NE1 in the time network into the first level, the method comprises:
configuring, for the NE1, a first clock identity, the first level priority, the first equipment priority and a clock class, wherein the first clock identity is a Medium Access Control (MAC) address of the NE1;
configuring, for the NE2, a second clock identity, the second level priority, the second equipment priority and the clock class, wherein the second clock identity is an MAC address of the NE2;
configuring, for the NE3, a third clock identity, the second level priority, a third equipment priority and the clock class, wherein the third clock identity is an MAC address of the NE3;
wherein, the second equipment priority is higher than the third equipment priority.

3. The method according to claim 2, wherein before receiving, by the NE3 in the downstream nodes which is connected to the NE1 through the PTP synchronization link, the first time synchronization message from the NE1, the method further comprises:
mapping a 1PPS+TOD synchronization input interface of the NE2 into a PTP synchronization input port.

4. The method according to claim 3, wherein mapping the 1PPS+TOD synchronization input interface of the NE2 into the PTP synchronization input port comprises:
constructing a data set of 1PPS+TOD reference sources for the NE2, wherein the data set comprises: the second clock identity, the second level priority, the second equipment priority, the clock class, port number, the number of hops, accuracy of clocks, jitter of clocks, a clock source and a time scale.

5. The method according to claim 4, wherein the NE3 determining that the clock parameter of the NE1 is optimal according to the first PTP announce message and the second PTP announce message, and synchronizing the local clock to the NE1 according to the first PTP announce message comprises:
after the NE3 determines that the first level priority is higher than the second level priority and the first equipment priority is higher than the second equipment priority, determining that the clock parameter of the NE1 is optimal;
the NE3 synchronizing the local clock to the NE1 according to the first level priority, the first equipment priority, the first clock identity and the clock class in combination with a Best Master Clock (BMC) algorithm.

6. The method according to claim 2, wherein
the first PTP announce message further comprises: the first clock identity and the clock class;
the second PTP announce message further comprises: the second clock identity and the clock class.

7. The method according to claim 6, wherein the NE3 determining that the clock parameter of the NE1 is optimal according to the first PTP announce message and the second PTP announce message, and synchronizing the local clock to the NE1 according to the first PTP announce message comprises:
after the NE3 determines that the first level priority is higher than the second level priority and the first equipment priority is higher than the second equipment priority, determining that the clock parameter of the NE1 is optimal;
the NE3 synchronizing the local clock to the NE1 according to the first level priority, the first equipment priority, the first clock identity and the clock class in combination with a Best Master Clock (BMC) algorithm.

8. The method according to claim 2, wherein the NE3 determining that the clock parameter of the NE1 is optimal according to the first PTP announce message and the second PTP announce message, and synchronizing the local clock to the NE1 according to the first PTP announce message comprises:
after the NE3 determines that the first level priority is higher than the second level priority and the first equipment priority is higher than the second equipment priority, determining that the clock parameter of the NE1 is optimal;
the NE3 synchronizing the local clock to the NE1 according to the first level priority, the first equipment priority, the first clock identity and the clock class in combination with a Best Master Clock (BMC) algorithm.

9. The method according to claim 3, wherein the NE3 determining that the clock parameter of the NE1 is optimal according to the first PTP announce message and the second PTP announce message, and synchronizing the local clock to the NE1 according to the first PTP announce message comprises:
after the NE3 determines that the first level priority is higher than the second level priority and the first equipment priority is higher than the second equipment priority, determining that the clock parameter of the NE1 is optimal;
the NE3 synchronizing the local clock to the NE1 according to the first level priority, the first equipment priority, the first clock identity and the clock class in combination with a Best Master Clock (BMC) algorithm.

10. A time synchronization system, comprising:
a classifying component, configured to classify a first Network Equipment (NE1) and upstream nodes of the NE1 in a time network into a first level, and classify downstream nodes of the NE1 into a second level, wherein a first level priority that needs to be used in time synchronization of the first level is higher than a second level priority that needs to be used in time synchronization of the second level, and an output port of the NE1 is connected to a 1 Pulse per Second+Time of Day (1PPS+TOD) synchronization link;

a receiving component, on a third Network Equipment NE3, in the downstream nodes which is connected to the NE1 through a Precision Time Protocol (PTP) synchronization link, configured to receive a first PTP announce message from the NE1 and a second PTP announce message sent by a second network equipment (NE2) which belongs to the downstream nodes, and is connected to the NE1 through the 1PPS+TOD synchronization link, wherein the first PTP announce message carries a first equipment priority of the NE1 and the first level priority;

a determining component, on the NE3, configured to determine that a clock parameter of the NE1 is optimal according to the first PTP announce message and the second PTP announce message;

a synchronizing component, on the NE3, configured to synchronize a local clock to the NE1 according to the first PTP announce message, wherein the second PTP announce message carries a second equipment priority of the NE2 and the second level priority, and the first equipment priority is higher than the second equipment priority.

11. The system according to claim 10, wherein, the system further comprises: a configuring component, configured to configure, for the NE1, a first clock identity, the first level priority, the first equipment priority and a clock class, wherein the first clock identity is a Medium Access Control (MAC) address of the NE1;

the configuring component is further configured to configure, for the NE2, a second clock identity, the second level priority, the second equipment priority and the clock class, wherein the second clock identity is an MAC address of the NE2;

the configuring component is further configured to configure, for the NE3, a third clock identity, the second level priority, a third equipment priority and the clock class, wherein the third clock identity is an MAC address of the NE3;

wherein, the second equipment priority is higher than the third equipment priority.

12. The system according to claim 11, wherein the system further comprises:

a mapping component, configured to map a 1PPS+TOD synchronization input interface of the NE2 into a PTP synchronization input port.

13. The system according to claim 12, wherein the mapping component comprises:

a constructing element, configured to construct a data set of 1PPS+TOD reference sources for the NE2, wherein the data set comprises: the second clock identity, the second level priority, the second equipment priority, the clock class, port number, the number of hops, accuracy of clocks, jitter of clocks, a clock source and a time scale.

14. The system according to claim 13, wherein the determining component comprises: a determining element, configured to, after determining that the first level priority is higher than the second level priority and the first equipment priority is higher than the second equipment priority, determine that the clock parameter of the NE1 is optimal;

the synchronizing component comprises: a synchronizing element, configured to synchronize the local clock to the NE1 according to the first level priority, the first equipment priority, the first clock identity and the clock class in combination with a Best Master Clock (BMC) algorithm.

15. The system according to claim 12, wherein the determining component comprises: a determining element, configured to, after determining that the first level priority is higher than the second level priority and the first equipment priority is higher than the second equipment priority, determine that the clock parameter of the NE1 is optimal;

the synchronizing component comprises: a synchronizing element, configured to synchronize the local clock to the NE1 according to the first level priority, the first equipment priority, the first clock identity and the clock class in combination with a Best Master Clock (BMC) algorithm.

16. The system according to claim 11, wherein the first PTP announce message further comprises: the first clock identity and the clock class;

the second PTP announce message further comprises: the second clock identity and the clock class.

17. The system according to claim 16, wherein the determining component comprises: a determining element, configured to, after determining that the first level priority is higher than the second level priority and the first equipment priority is higher than the second equipment priority, determine that the clock parameter of the NE1 is optimal;

the synchronizing component comprises: a synchronizing element, configured to synchronize the local clock to the NE1 according to the first level priority, the first equipment priority, the first clock identity and the clock class in combination with a Best Master Clock (BMC) algorithm.

18. The system according to claim 11, wherein the determining component comprises: a determining element, configured to, after determining that the first level priority is higher than the second level priority and the first equipment priority is higher than the second equipment priority, determine that the clock parameter of the NE1 is optimal;

the synchronizing component comprises: a synchronizing element, configured to synchronize the local clock to the NE1 according to the first level priority, the first equipment priority, the first clock identity and the clock class in combination with a Best Master Clock (BMC) algorithm.

19. The system according to claim 10, wherein the determining component comprises: a determining element, configured to, after determining that the first level priority is higher than the second level priority and the first equipment priority is higher than the second equipment priority, determine that the clock parameter of the NE1 is optimal;

the synchronizing component comprises: a synchronizing element, configured to synchronize the local clock to the NE1 according to the first level priority, the first equipment priority, the first clock identity and the clock class in combination with a Best Master Clock (BMC) algorithm.

* * * * *